(12) United States Patent
Nibe et al.

(10) Patent No.: US 6,680,785 B1
(45) Date of Patent: Jan. 20, 2004

(54) DIGITAL PRINTER AND ITS PRINTING METHOD

(75) Inventors: Toru Nibe, Tokyo (JP); Tadao Shinya, Yokohama (JP); Yutaka Endo, Yokohama (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 792 days.

(21) Appl. No.: 09/585,125

(22) Filed: Jun. 1, 2000

(30) Foreign Application Priority Data

Jun. 4, 1999 (JP) .............................. 11-158326

(51) Int. Cl.$^7$ ......................... G06F 15/00; G06F 13/00; G06F 3/12; G06K 15/02
(52) U.S. Cl. ......................... 358/1.9; 358/1.1; 358/1.5; 358/1.8; 347/9; 347/15; 347/117
(58) Field of Search .................. 347/15, 9, 117; 358/1.8, 1.5, 1.9, 1.1

(56) References Cited

U.S. PATENT DOCUMENTS

| 5,771,048 | A | * | 6/1998 | Nankou et al. | ............. | 345/471 |
| 5,870,130 | A | * | 2/1999 | Bae | ............................. | 347/183 |
| 6,120,123 | A | * | 9/2000 | Tanaka | ........................ | 347/15 |
| 6,390,580 | B1 | * | 5/2002 | Anderson et al. | ............. | 347/9 |

FOREIGN PATENT DOCUMENTS

| JP | 54-148542 | 11/1979 |
| JP | 57-152969 A | 9/1982 |
| JP | 58-1579 A | 1/1983 |
| JP | 61-50464 A | 3/1986 |

* cited by examiner

Primary Examiner—Edward Coles
Assistant Examiner—Chan Park
(74) Attorney, Agent, or Firm—Anderson Kill & Olick; Eugene Lieberstein; Michael N. Meller

(57) ABSTRACT

Each pixel receives a digital picture data having a multi-gradation data. A line composed of printing pixels having a thickness difference of multi-gradations is obtained on a recording paper by controlling whether or not there exist ink transcription by each gradation with a line head. A digital printer of printing a picture by recording a plurality of lines on a recording paper with scanning by the line head, comprising counting devices (5-1, 5-2) for counting a number of pixels to print at each gradation, dividing devices (9-1, 9-2, 12-1, 12-2, 13-1, 13-2) for dividing all pixels into several groups in accordance with the counting devices and deciding devices (10-1, 10-2, 11-1, 11-2) for deciding a number of groups. A range of grouping and as number of groups can be changed so as for a number of printing pixels in every group to be equal to a predetermined number of simultaneous turn-on pixels. During a printing operation at each gradation, a pixel of simultaneously printing in one line is limited to a unit of the group and prints each gradation a plurality of times. Accordingly, a number of simultaneous turn-on pixels can always be held constant except a specific case.

6 Claims, 12 Drawing Sheets

DIGITAL PRINTER AND ITS PRINTING METHOD

BACKGROUND OF THE INVENTION

1. Field of the Invention

The present invention relates to a digital printer, which prints an image obtained as a digital image data on a recording paper, and relates to a printing method of the digital printer.

2. Description of the Related Art

A digital printer receives a still picture data, which is described a gradation value of each pixel with a digital data, from a host computer or like, hereinafter called a host, and prints the still picture data line by line sequentially. Finally, a sheet of still picture is obtained on a recording paper.

In order to suppress total power capacity of a printer while printing, such a digital printer does not simultaneously conduct all printing elements per line of a printer head and prints with dividing the printing elements into several times. In other words, a number of elements to be simultaneously conducted is limited, so that necessary supply current is limited to not more than a predetermined value. Accordingly, power capacity required for a power supply section of the printer can be suppressed and is advantageous to dimensions and cost of the printer.

FIG. 9 is a block diagram of signal processing circuit in a digital printer performing divisional printing according to the prior art.

FIG. 10 is a timing chart showing behavior of each signal at a gradation number "L" according to the prior art.

Various kinds of methods of dividing printing data can be considered. A method of masking picture data transmitted to a printing head by using a data mask signal is depicted hereinafter. Further, a number of divisions is assumed to be 4 as an example.

As shown in FIG. 9, a host not shown retaining a picture data transmits the picture data to a signal processing circuit line by line in order. The picture data of one line is stored in a line memory 1 in accordance with a control signal of a memory controller 2. The memory controller 2 starts on controlling to read out the picture data from the line memory 1 when the picture data of one line is stored completely, and transmits the data to a level comparator 3 pixel by pixel from a head pixel of the line to an end pixel in order. When the last pixel of the line is read out completely, the reading out operation starts once again from a head pixel of the next line data. A line data is read out repeatedly as many times as a number of printing gradations.

A gradation data from a level counter 21 is inputted to the level comparator 3 in conjunction with a pixel data read out from the line memory 1. The level counter 21 starts on counting from a count number "0" and counts up one by one at each time when a count finish signal is inputted from a division number counter 24 in conjunction with starting on reading out a line data from the line memory 1. The level counter 21 keeps counting up until a counting value reaches a value of printing gradation number.

The level comparator 3 compares a picture data from the line memory 1 with a level count value. In a case that a picture data value is larger than a level count value, the level comparator 3 outputs "1" (High level signal) and the pixel becomes a printing pixel at a gradation number indicated by a current level count value. In a case that a picture data value is equal to or smaller than a level count value, the level comparator outputs "0" (Low level signal) and the pixel is not a printing pixel. The output from the level comparator 3 is transmitted to a thermal head not shown through an AND gate 13 and becomes a printing data.

A count number in the division number counter 24 is reset to' "0" at each time when each gradation printing starts. The count number is counted up one by one at each period of reading out line data. Printing of the current gradation finishes when the count number is counted up from "0" to "3", and the count number is reset to "0" when a next gradation printing starts. The count number is inputted to a data mask selecting section 23. The division number counter 24 transmits a signal of count finish to the level counter 21 at each time when counting is completed and printing is shifted to a next gradation, and make the level counter 21 count up.

A data mask producing section 22 produces 4 data mask signals (data masks "0" through "3"), which divide the period of reading out line data into 4 equally such as data masks "0" through "3" shown in FIG. 10. Each data mask is inputted into the data mask selecting section 23 and one data mask is selected in accordance with a count value outputted from the division number counter 24. The selected data mask signal is inputted into the AND gate 13 in conjunction with a pixel data from the level comparator 3. FIG. 10 shows a case that the data mask "0" is selected in a first line data readout period.

Accordingly, a line printing is performed 4 times per each gradation. Since a different data mask is selected at each time and a picture data from the level comparator 3 is masked in the AND gate 13, printing pixels constituting a line are divided into a plurality of pairs by a time sharing method at each gradation and transmitted to the thermal head not shown in FIG. 9.

When a data of a first line is completely read out throughout all printing gradations, a data of one line is transferred to the thermal head completely. The memory controller 2 writes data of a second line from the host into the line memory 1 and controls on reading out the data of the second line from the line memory 1. The signal processing circuit shown in FIG. 9 keeps transferring a picture data from the host to the thermal head through the above mentioned signal processing. Processing picture data of one field comes to end when data of all lines are completely processed such that data of a third line, fourth line and up to a final line are repeatedly read out and wrote in according to an order of line. In a case of color printing, a color picture is obtained by printing the three primary colors of yellow, magenta and cyan repeatedly 3 times for 3 fields.

FIG. 11 shows an electrical configuration of a thermal head "SH" according to the prior art. The thermal head "SH" comprises two groups of registers, which equal to a number of line dots multiplied by 1 bit. Each register RE of a first register group 31 is corresponding to each heat generating element 35 and decides to turn on or off electricity to the heat generating element 35 by hold parameters of the register RE. The thermal head "SH" receives a serial picture data of 1 bit wide from the AND gate 13 shown in FIG. 9 and the serial picture data is sequentially accumulated in the first register group 31 constituting a shift register. When accumulation of data of one line is completed, data of the first register group 31 are transferred to a second register group 32 by a register set signal emitted from a thermal head controlling section not shown. The heat generating element 35 is turned on in response to a data value of the second register group 32 and prints a first time divisional printing. A data of next one line is written in the first register group 31 at a same time as printing the first time divisional printing. A turn-on period is controlled by a pulse width of a control signal of turn-on pulse width emitted from the thermal head controlling section not shown. A signal performed by the AND operation between a truth or falsehood value of each register in the second register group 32 and a control signal of turn-on pulse width at each AND gate 33 is inputted to a turn-on switch element 34. In a case that an input value of the signal is truth, the heat generating element 35 is turned on.

According to the controlling method mentioned above, a division number is fixed. However, the Japanese Patent Laid-open Publication No. 62-58584 discloses the controlling method of varying a number of sections to be simultaneously turned on in response to a total number of printing pixels after dividing a line into plural sections. According to the controlling method, a division number is dynamically changed, so that it is advantageous for a printer to print at a higher rate of printing speed comparing with the printing method of always fixing the division number to a predetermined value as mentioned above.

According to the divisional printing method of the prior art mentioned above, printing pixels of one line are divided into a plurality of data and each data is printed with staggering the time. Therefore, a power capacity can be suppressed by limiting a number of simultaneous turn-on dots and suppressing power consumption per unit hour. However, a number of printing dots per each gradation is not perfectly maintained in a predetermined value although a number of simultaneous turn-on pixels can be limited to less than the predetermined value. The number of simultaneous turn-on pixels varies by contents of a picture data. Accordingly, a power supply for driving thermal head is affected by a load fluctuation caused by change of a number of simultaneous turn-on pixels, so that an output voltage varies. The voltage variation affects printing density and creates a problem of deteriorating picture quality.

Further, the controlling method of the Japanese Patent Laid-open Publication No. 62-58584 discloses the effects of increasing the printing speed comparing with the printing method of always fixing the division number to a predetermined value as well as suppressing power consumption. However, a number of turn-on pixels can only be controlled by a unit of divisional section, so that scattering of a number of simultaneous turn-on pixels occurs. Accordingly, the controlling method does not improve efficiency for a higher printing speed.

SUMMARY OF THE INVENTION

Accordingly, in consideration of the above-mentioned problem of the prior art, an object of the present invention is to provide a digital printer, which always maintains a number of simultaneous turn-on pixels except a special case.

In order to achieve the above object, the present invention provides a digital printer, which receives a digital picture data composed of pixels having a multi-gradation data respectively and obtains a line composed of printing pixels having a density difference of multi-gradations on a recording paper by controlling the digital picture data with a line head whether or not there exist ink transcription at each gradation and prints a picture by recording a plurality of lines obtained by scanning with the line head on a recording paper, the digital printer comprising counting means for counting a number of pixels for printing at each gradation, dividing means for dividing total pixels into several groups in accordance with a count value of said counting means and deciding means for deciding a dividing number of groups, the digital printer is further characterized by that a range of grouping and a dividing number of groups are changeable so as for a number of printing pixels in the groups to be equal to a predetermined number as a number of simultaneous printing pixels, and that a pixel of simultaneously printing in one line is limited to a unit of the group during printing operation at each gradation, and that printing of each gradation is divided into a plurality of times.

According to an aspect of the present invention, there provided a printing method of a digital printer, which receives a digital picture data composed of pixels having a multi-gradation data respectively and obtains a line composed of printing pixels having a density difference of multi-gradations on a recording paper by controlling the digital picture data with a line head whether or not there exist ink transcription at each gradation and prints a picture by recording a plurality of lines obtained by scanning with the line head on a recording paper, the printing method comprising a step of counting a number of pixels for printing at each gradation, a step of dividing total pixels into several groups in accordance with a count value of the counting means and a step of deciding a dividing number of groups, the printing method is further characterized by that a range of grouping and a dividing number of groups are changeable so as for a number of printing pixels in the groups to be equal to a predetermined number as a number of simultaneous printing pixels, and that a pixel of simultaneously printing in one line is limited to a unit of the group during printing operation at each gradation, and that printing of each gradation is divided into a plurality of times.

Other object and further features of the present invention will be apparent from the following detailed description when read in conjunction with the accompanying drawings.

DETAILED DESCRIPTION OF THE PREFERRED EMBODIMENTS

Embodiment

According to an aspect of the present invention, there provided a digital printer, which can always maintain a number of simultaneous turn-on pixels.

Figure 1A:
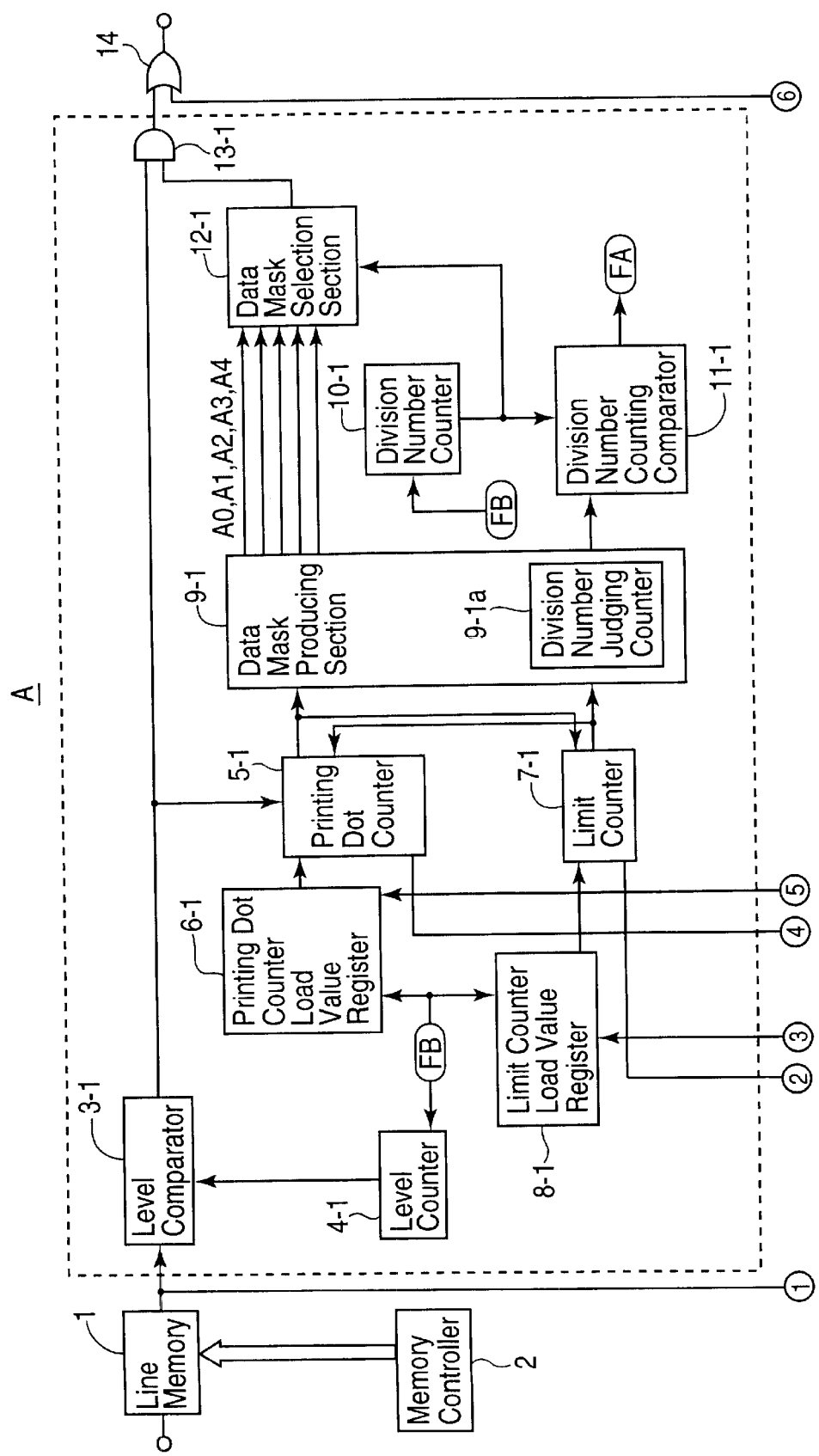
FIG. 1(a) is a block diagram showing a block "A" of a signal processing system of a digital printer according to an embodiment of the present invention.
Figure 1B:
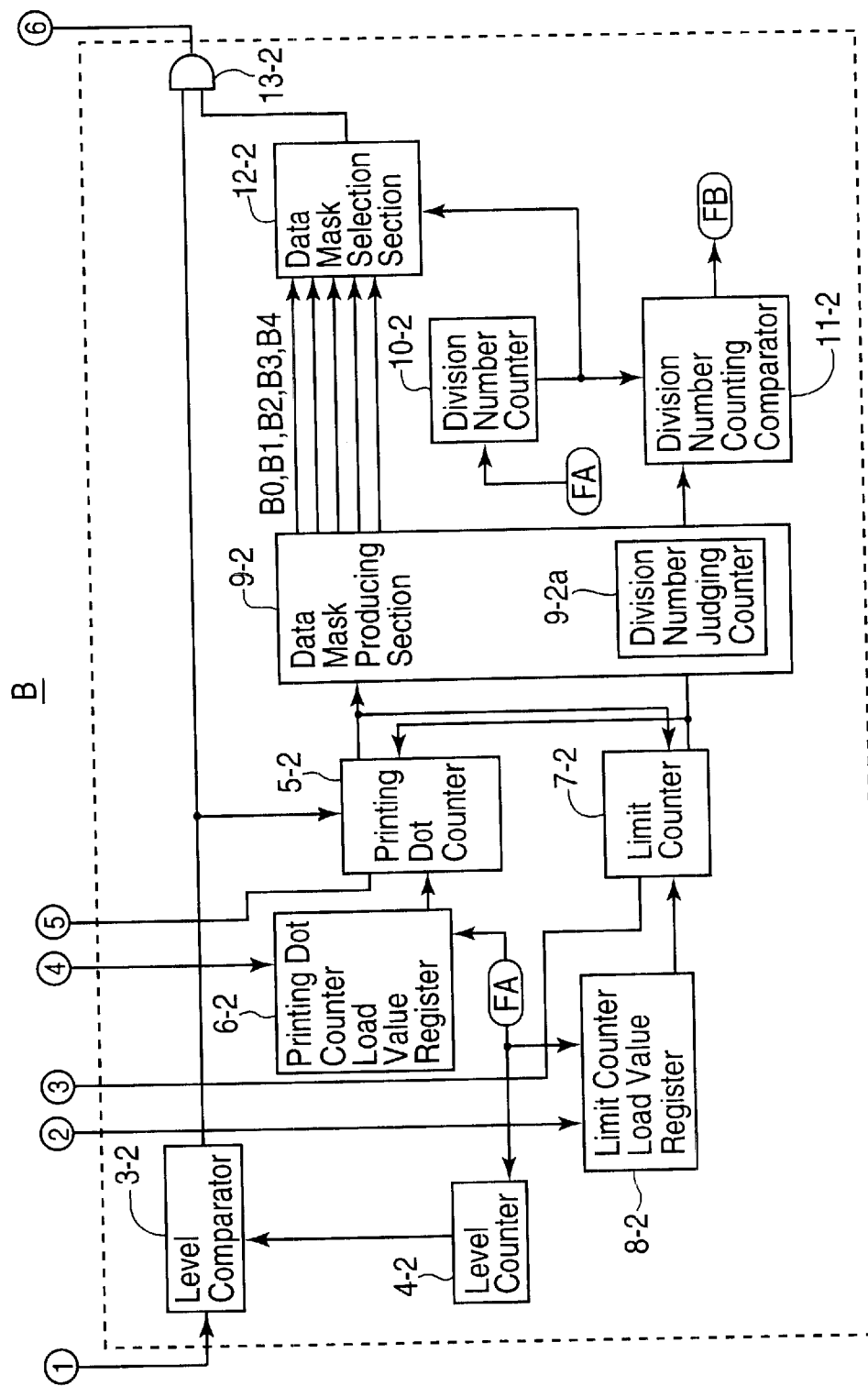
FIG. 1(b) is a block diagram showing a block "B" of the signal processing system of the digital printer according to the embodiment of the present invention.

FIGS. 1(a) and 1(b) are a block diagram of a signal processing system in a digital printer according to an embodiment of the present invention. They show a block "A" and a block "B" of the signal processing system respectively, wherein they are connected each other through terminal numbers ① through ⑥.

This embodiment is explained with assuming that a number of pixels in one line is 512 dots, a prescribed number of simultaneous turn-on pixels is 128 dots and a gradation number of each pixel is 256.

In FIGS. 1(a) and 1(b), a signal processing system of a digital printer, according to the embodiment of the present invention, comprises a line memory 1, a memory controller 2, a block "A" (even numbered level data controlling section), a block "B" (odd numbered level data controlling section) and an OR gate 14, wherein an even numbered level of picture level out of a picture data of 256 gradations or levels is controlled by the block "A" and an odd numbered level of picture level is controlled by the block "B". Further, a configuration of the block "B" is a same as that of the block "A". The block "A" ("B") further comprise a level comparator 3-1 (3-2), a level counter 4-1 (4-2), a printing dot counter 5-1 (5-2), a printing dot counter load value register 6-1 (6-2), a limit counter 7-1 (7-2), a limit counter load value register 8-1 (8-2), a data mask producing section 9-1 (9-2), a division number counter 10-1 (10-2), a division number counting comparator 11-1 (11-2), a data mask selecting section 12-1 (12-2) and an AND gate 13-1 (13-2), wherein the data mask producing section 9-1 (9-2) is composed of a division number judging counter 9-1a (9-2a).

With referring to FIGS. 1(a) and 1(b), a picture data of one line from a host computer (host) not shown is transmitted to the line memory 1 line by line in order, wherein the line memory 1 has a capacity of storing a picture data of one line, that is, a capacity of 8 bits multiplied by 512 dots. The picture data is stored in the line memory 1 in accordance with a control signal from the memory controller 2. The memory controller 2 controls on reading out the picture data from the line memory 1 when the picture data is stored in the lime memory 1 completely, and transmits the read-out picture data to the level comparators 3-1 and 3-2 pixel by pixel from a head pixel to an end pixel of the line in order. When the last pixel of the line is read out completely, the reading out operation starts once again from a head pixel of next line data. Reading out line data repeats as many times as a number of printing gradation numbers.

A gradation data from the level counter 4-1 (4-2) is inputted to the level comparator 3-1 (3-2) in conjunction with a pixel data read out from the line memory 1. The level counter 4-1 (4-2) counts a gradation level value. A counting value of the level counter 4-1 is an even numbered value. On the other hand, a counting value of the level counter 4-2 is an odd numbered value. Both the even and odd numbered counting values are +2 count or count up by 2. A counting up is performed by division count comparator flags "FA" and "FB" emitted from the division number counting comparators 11-1 and 11-2 respectively.

The level comparator 3-1 (3-2) compares the picture data from the line memory 1 with a gradation number from the level counter 4-1 (4-2). In a case that a picture data value is larger than a gradation number, the level comparator 3-1 (3-2) outputs "True" (High level) signal. In a case that a picture data value is equal to or smaller than a gradation number, the level comparator 3-1 (3-2) outputs "False" (Low level) signal. The "True" signal becomes an origin of printing data at each gradation.

The printing dot counter 5-1 (5-2) counts a number of data, which becomes "True" by a comparing result of the level comparator 3-1 (3-2). A printing dot count flag is generated when a counting value is equal to a simultaneous turn-on pixel nominal value, for example, 128. A counting value is reset to "1" when the printing dot counter 5-1 (5-2) receives a next "True" signal from the level counter 4-1 (4-2), and then each printing dot counter keeps counting.

From the printing dot count flag, the data mask producing section 9-1 (9-2) produces data masks A0 through A4 (B0 through B4), which are used for a number of turn-on dots so as to be equal to a predetermined value such as 128. Further, the printing dot count flag resets a counting value of the limit counter 7-1 (7-2) to "0".

The printing dot counter 5-1 (5-2) mentioned above includes the printing dot counter load value register 6-1 (6-2) holding load values.

The printing dot counter load value register 6-1 stores a counting value of the printing dot counter 5-2 in the block "B" at a timing when the division number counting comparator 11-2 generates the division count comparator flag "FB", and holds the counting value. On the other hand, the printing dot counter load value register 6-2 stores a counting value of the printing dot counter 5-1 in the block "A" at a timing when the division number counting comparator 11-1 generates the division count comparator flag "FA", and holds the counting value. Loading a register value into respective printing dot counters 5-1 and 5-2 is performed at every timing when a counting value flag is generated from a control block not shown, which controls a total timing during each inactive period. The timing of loading a register value into each printing dot counter occurs before a division count comparator flag is generated although the division count comparator flag is also generated during each inactive period.

Accordingly, by setting and loading a printing dot count value in the other block as mentioned above, printing can be continued with succeeding to a current dot count number from respective blocks "A" and "B" when a printing process is transferred from an even numbered gradation to an odd numbered gradation and vice versa.

The limit counter 7-1 (7-2) judges whether or not a number of dots including printing and not printing exceed a number of dots per line, 512 dots, for example, and generate a limit counter flag and reset a counting value to "0".

Further, the limit counter flag is transferred to the data mask producing section 9-1 (9-2) and used as a flag for producing a data mask. Furthermore, the limit count flag resets a counting value of the printing dot counters 5-1 (5-2).

In a case that a counting value of dot number exceeds a number of dots per line, in other words, in a case that values of the limit counter 7-1 (7-2) reaches a value equivalent to a number of dots per line before a number of printing dots reaches a nominal value of simultaneous turn-on pixels such as 128 and the limit counter 7-1 (7-2) is reset by a printing dot counter flag, data of dots to be read out thereafter are a gradation number, which is larger than a gradation number indicated by the current level counter 4-1 (4-2) by 1 and data of a dot to be compared. Therefore, an output from the level comparator 3-1 (3-2) after a counting value of dot number exceeds the number of dots per line is a false data. In order to mask the false data, the limit counter flag mentioned above controls a mask production in conjunction with a printing dot counter flag by the data mask producing section 9-1 (9-2).

In a case that a limit counter flag is generated, a number of printing dots in dot numbers equivalent to 1 line of a head is less than a nominal value of simultaneous turn-on pixels such as 128. In this case, a number of simultaneous turn-on dots is also less than a nominal value such as 128 and turn-on power is less than a predetermined value, so that power consumption can not be kept constant temporarily.

The limit counter 7-1 (7-2) comprises the limit counter load value registers 8-1 (8-2) holding a load value as a same manner as the printing dot counter 5-1 (5-2). The limit counter load value register 8-1 stores a counting value of the limit counter 7-2 in the block "B" at a timing when the division number counting comparator 11-2 generates the division count comparator flag "FB", and holds the counting value. On the other hand, the limit counter load value register 8-2 stores a counting value of the limit counter 7-1 in the block "A" at a timing when the division number counting comparator 11-1 generates the division count comparator flag "FA", and holds the counting value. Loading a register value into the limit counters 7-1 (7-2) is performed at every timing when a counting value flag is generated. The timing of loading a register value into each limit counter occurs before a division count comparator flag is generated although the division count comparator flag is also generated during each inactive period.

Accordingly, by setting and loading a counter value of the limit counter 7-1 (7-2) in the block "A" ("B") as mentioned above, printing can be continued with succeeding to a limit counter number from respective blocks "A" and "B" when a printing process is transferred from a even numbered gradation to a odd numbered gradation and vice versa.

The data mask producing section 9-1 (9-2) produces a plurality of data mask signals A0 through A4 (B0 through B4) simultaneously in conjunction with determining a division number at each gradation by the division number judging counter 9-1a (9-2a) included in the data mask producing section 9-1 (9-2) with a flag from the printing dot counter 5-1 (5-2) and a flag from the limit counter 7-1 (7-2). Further, a value of the determined division number is outputted to the division number count comparator 11-1 (11-2). The division number judging counter 9-1a (9-2a) is reset to "0" every time during each inactive period.

One of 5 data masks (signals) A0 through A4 (B0 through B4), which are produced in the data mask producing section 9-1 (9-2), is selected by the data mask selecting section 12-1 (12-2) with a count number of the division number counter 10-1 (10-2) and a data is masked by the AND gate 13-1 (13-2). However, in a case that a value of the division number counter 10-1 (10-2) is more than 5, that is, maximum division number 4 plus one, a "Low" level signal covering a period of reading out one line is outputted and a data is completely masked by the AND gate 13-1 (13-2).

Data masked by the 5 data masks A0 through A4 and B0 through B4 from the blocks "A" and "B" are inputted into the OR gate 14 and synthesized, and then transferred to a thermal head not shown as a printing data.

The division number counter 10-1 (10-2) counts a division number such that current printing is ranked as a which division number in a divisional printing. Counting up each division number counter is performed during each inactive period prior to resetting the division number judging counters 9-1a and 9-2a to "0". The division number counter 10-1 (10-2) is reset to "0" by the division count comparator flag "FB" ("FA") from the block "B" ("A").

A count number of the division number counter 10-1 (10-2) is inputted into the division number count comparator 11-1 (11-2) in conjunction with a division number signal from the data mask producing section 9-1 (9-2), and the count number is compared with the division number in the division number count comparator 11-1 (11-2). The comparing operation is performed during an inactive period arranged between each data processing at each gradation.

The division number mentioned above is counted at each gradation by the division number judging counter 9-1a (9-2a) in the data mask producing section 9-1 (9-2) and outputted as a final division number during an inactive period. This judgement is performed immediately after counting up of the division number counter 10-1 (10-2). In a case of being judged such that a division number is equal to a count value, the division number count comparator 10-1 (10-2) generates the division count comparator flag "FA" ("FB").

The division count comparator flag "FA" ("FB") resets a load value of the printing dot counter 5-2 (5-1) and the limit counter 7-2 (7-1) in the block "B" ("A") and resets the division number counter 10-2 (10-1) and further performs counting up of the level counter 4-2 (4-1).

Operation of this embodiment is depicted with assuming that a number of pixels per line is 512 dots, a nominal value of simultaneous turn-on pixel numbers at a divisional printing is 128 dots and a number of gradation of each pixel is 256 as mentioned above.

At first, the line memory 1 has a memory capacity of storing one line of a picture data being transmitted from the host, that is, a capacity of 8 bits multiplied by 512 dots.

Figure 2:
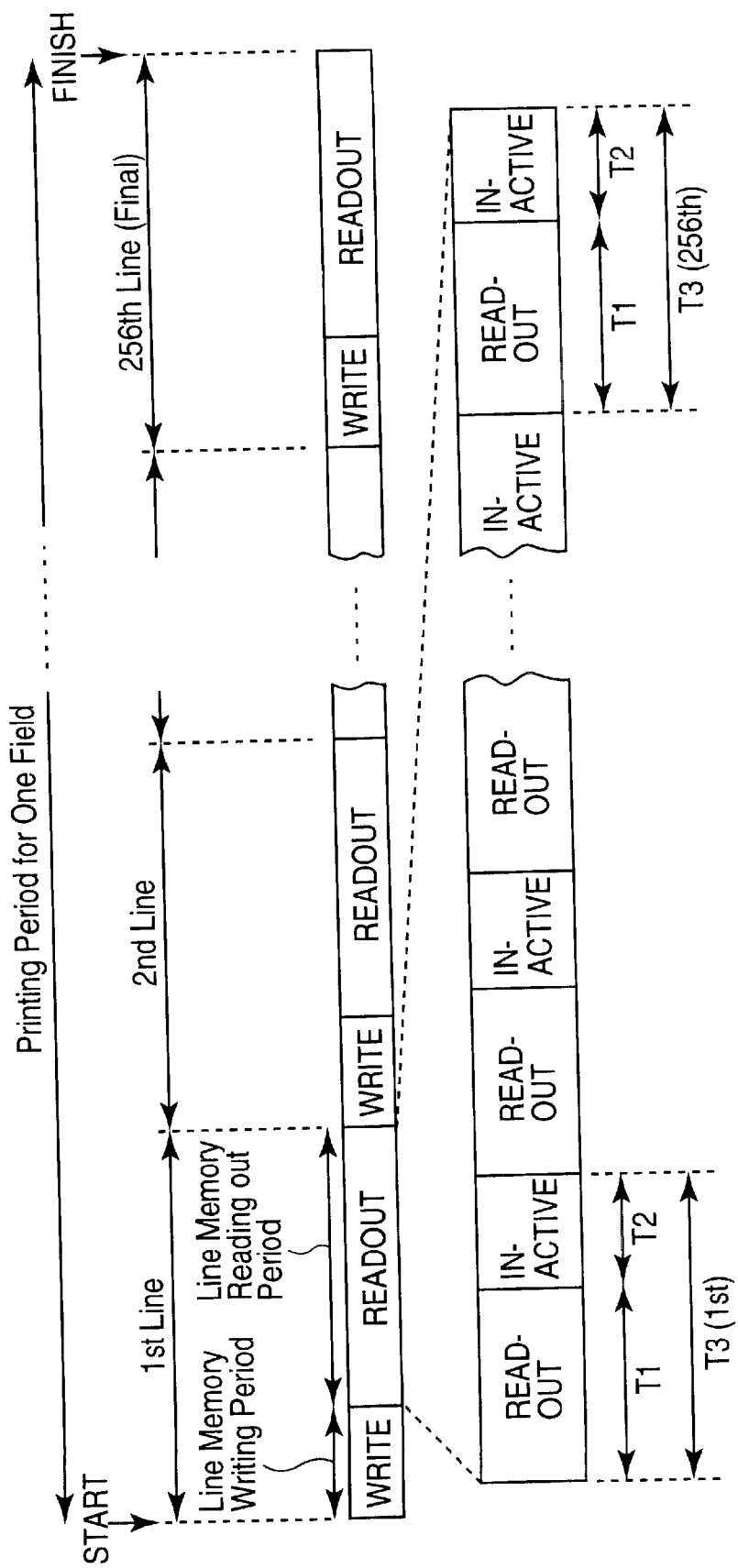
FIG. 2 shows a conceptual diagram of operation of a line memory during a process from start of printing to end of printing according to the embodiment of the present invention.

FIG. 2 shows a conceptual diagram of operation of a line memory during a process from start of printing to end of printing according to the embodiment of the present invention.

In FIG. 2, a picture data of one line is written into the line memory 1 at a beginning of printing period of each line. A process proceeds to a reading out period when the writing into the line memory 1 is completed.

Reading out during a reading out period is performed such that a data of one line is sequentially read out as many times as division numbers at each gradation. The reading out period of a data of one line is hereinafter called a line readout period T1. Further, there provided a short period between a line readout period and a next line readout period, during the short period, reading out the line memory 1 is not performed. The short period is hereinafter called an inactive period T2. A total period including the line readout period T1 and the inactive period T2 is hereinafter called a gradation printing period T3. Printing of one line completes by repeating the gradation printing period T3 as many times as gradation numbers. Succeedingly, writing into the line memory 1 and reading out the line memory 1 are performed sequentially in a next line printing period. Printing a picture of one field is completed when writing in and reading out the line memory 1 up to a final line (a 256th line) is finished. In a case of color printing, a color picture can be obtained by printing the 3 primary colors, yellow, magenta and cyan with repeating 3 times the operations for 3 fields.

Figure 3:
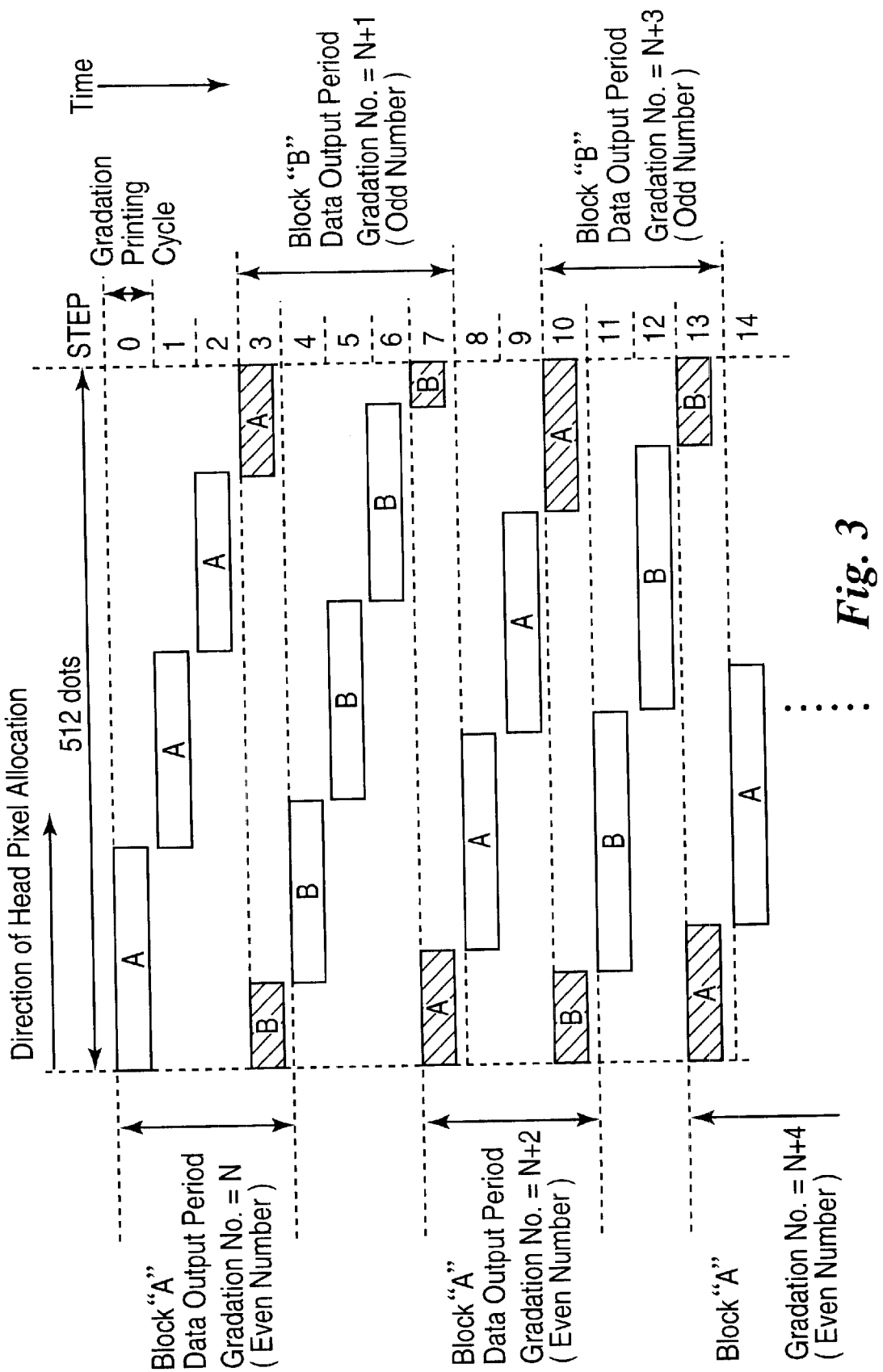
FIG. 3 shows a grouping of printing pixels and a change of printing positions along with a progress of printing operation according to the embodiment of the present invention.

FIG. 3 shows a grouping of printing pixels and a change of printing positions along with a progress of printing operation according to the embodiment of the present invention.

In FIG. 3, a wording "STEP", which shows a time change by a unit of gradation printing cycle, is used for explaining a progress of printing operation.

As explained above with referring FIG. 1, the signal processing system comprises 2 blocks "A" and "B", which are composed of the same components. The block "A" performs a data processing of even numbered gradation levels and the block "B" performs a data processing of odd numbered gradation levels.

With assuming that the block "A" processes a data of a Nth gradation, where the "N" is an even number, the block "A" compares the gradation number "N" with a picture data, which is sequentially read out from the line memory 1 during a line readout period T1. A pixel, which is judged such that the gradation number "N" is smaller than the picture data, is printed at the gradation number "N" (STEP "0"). On the other hand, a number of printing pixels is always counted and printing during current gradation printing period is completed when the number of printing pixels exceeds the nominal value of simultaneous turn-on pixels, that is, 128 dots. A data processing of the Nth gradation is performed in succeeding gradation printing cycles or STEPs 1, 2 and 3, wherein 128 pixels are counted as the same manner as in the STEP "0" and printed. The printing shown in FIG. 3 is performed such that the Nth gradation is divided into 4 divisional printing processes.

In STEP 3, a number of printing pixels of the Nth gradation in the block "A" is less than 128 dots. In this STEP 3, a data processing of a (N+1)th gradation (an odd numbered gradation) is also performed in the block "B" at the same time as the data processing of the Nth gradation in the block "A". Further, a total number of pixels, which are processed as printing pixels in the blocks "A" and "B", is processed to be 128 dots as shown in shadowed areas of STEP 3 in FIG. 3. Accordingly, a number of printing pixels is always maintained in 128 dots throughout the STEPs "0" to 3 and turn-on electricity supplied to a thermal head is always constant.

In STEPs 4, 5 and 6, a data processing of the (N+1)th gradation (odd numbered gradation) is performed in the block "B" as the same manner as in STEPs "0" through 2. In STEP 7, the data processing of the (N+1)th gradation in the block "B" and a (N+2)th gradation in the block "A" are simultaneously performed. Accordingly, turn-on electricity to the thermal head is always kept constant.

Figure 4:
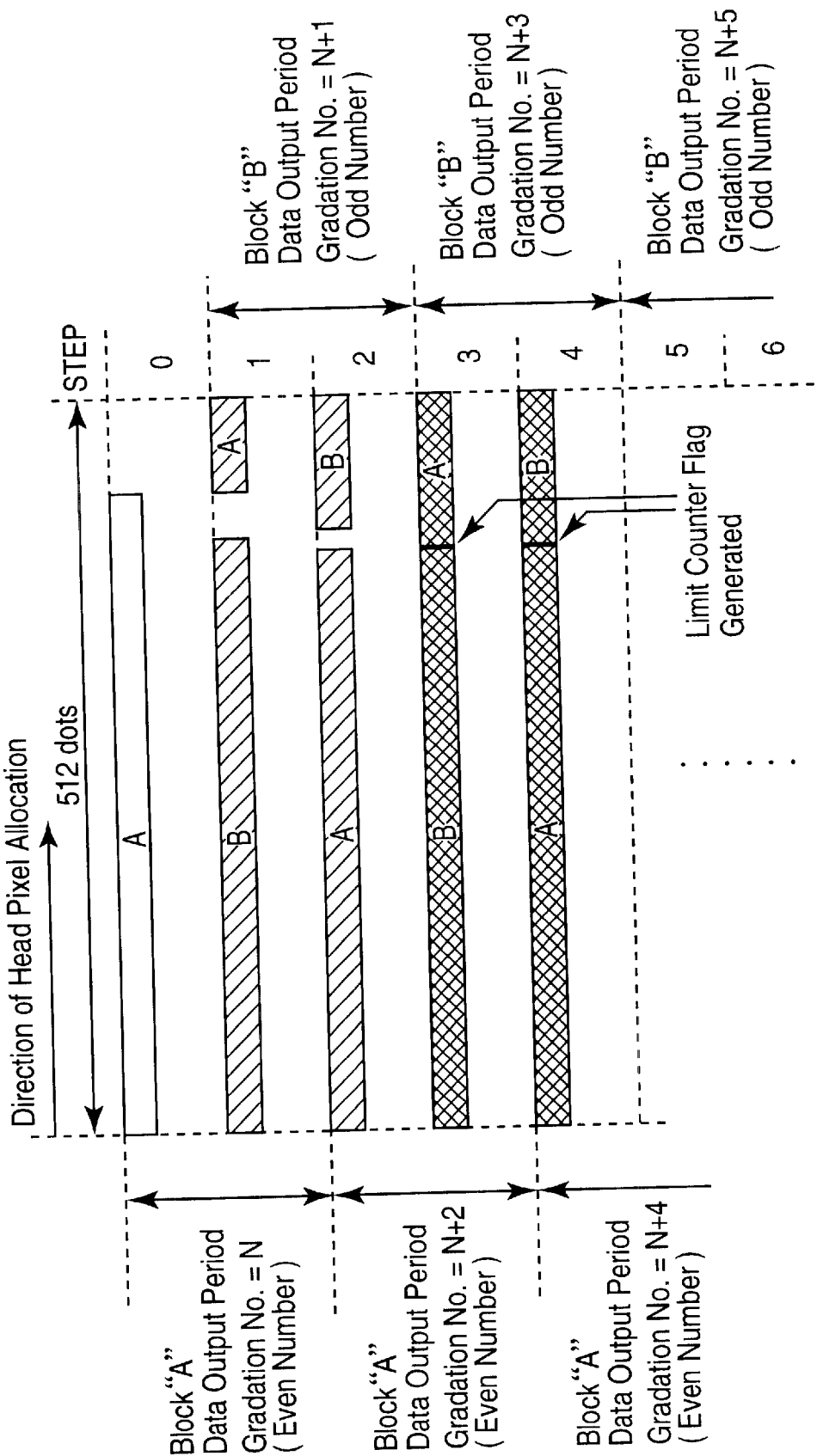
FIG. 4 shows a grouping of printing pixels and a change of printing positions along with a progress of printing operation when a limit count flag occurs according to the embodiment of the present invention.

FIG. 4 shows a grouping of printing pixels and a change of printing positions along with a progress of printing operation when a limit count flag generated in the limit counter according to the embodiment of the present invention.

In FIG. 4, a picture data of a gradation number "N" (an even number) is processed in the block "A" (STEP "0") and pixels of 128 dots are printed. Since a number of printing pixels is small, a printing range of STEP "0" covers almost all pixels of 512 dots per line. In STEP 1, a printing data of pixels less than 128 dots is transferred to the thermal head form the block "A", in addition thereto, a process of a gradation number (N+1) (an odd number) is performed in the block "B". Accordingly, pixels of 128 dots in total are printed in STEP 1.

In STEP 2, a printing data of pixels less than 128 dots is transferred to the thermal head by the block "B", in addition thereto, a process of a gradation number (N+2) (an even number) is performed in the block "A". Accordingly, pixels of 128 dots in total are printed in STEP2.

In STEP 3, a printing data of pixels less than 128 dots is transferred to the thermal head from the block "A", in addition thereto, a process of a gradation number (N+3) (an odd number) is performed in the block "B". However, a number of pixel data processed in the blocks "A" and "B" reaches 512 dots for one line before a total number of printing pixels reaches 128 dots, and then a limit counter flag is generated by the limit counters 7-1 and 7-2. Accordingly, a number of printing pixels in STEP 3 becomes less than 128 dots. In succeeding STEP 4 and after, the same process as in STEP 3 is performed.

Figure 5:
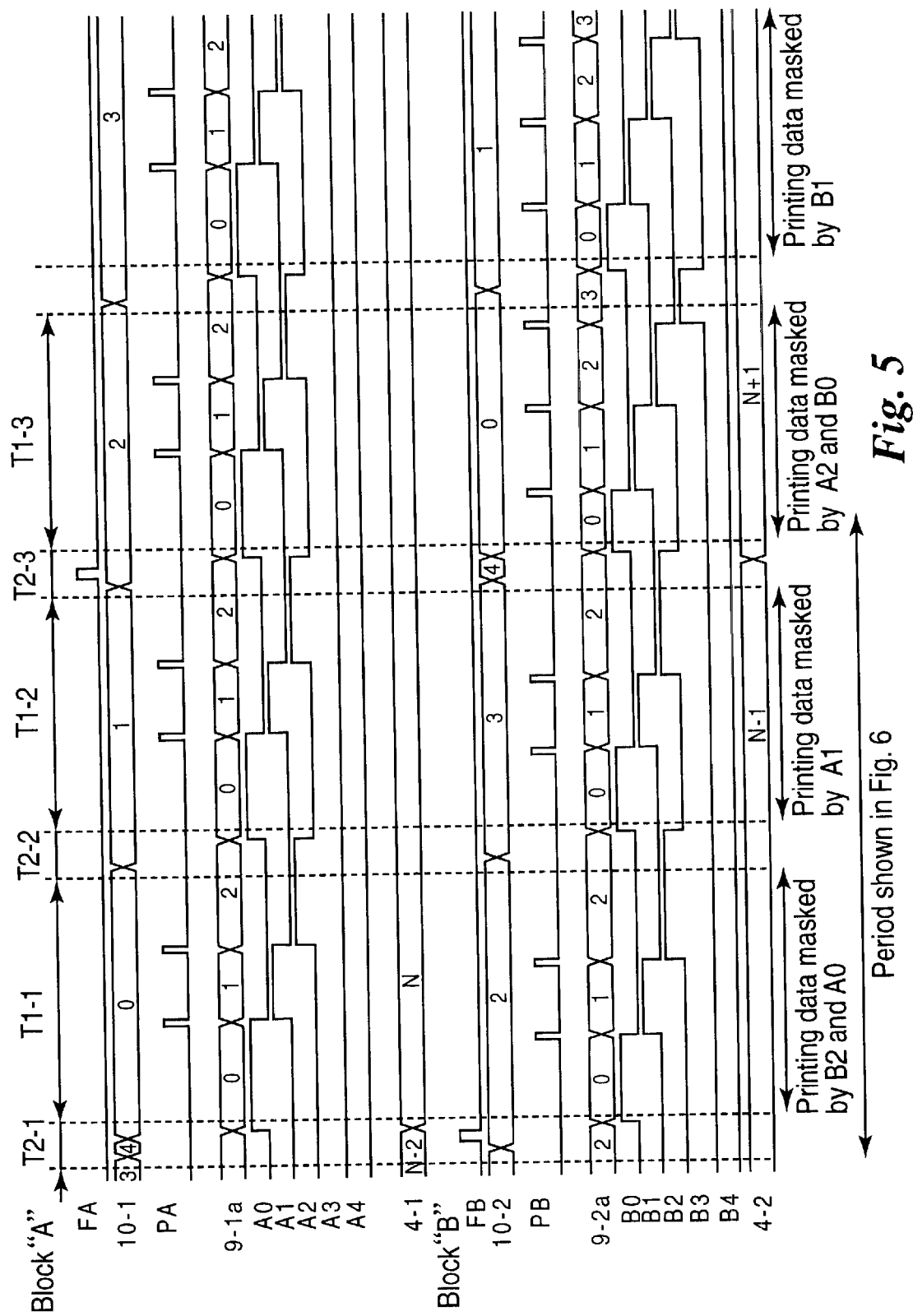
FIG. 5 is a timing chart of depicting a detailed operation of each signal in a data control block when a limit count flag does not occur according to the embodiment of the present invention.

FIG. 5 shows a timing chart of depicting a detailed operation of each signal in a data control block when a limit count flag is not generated by the limit counter according to the embodiment of the present invention.

Figure 6:
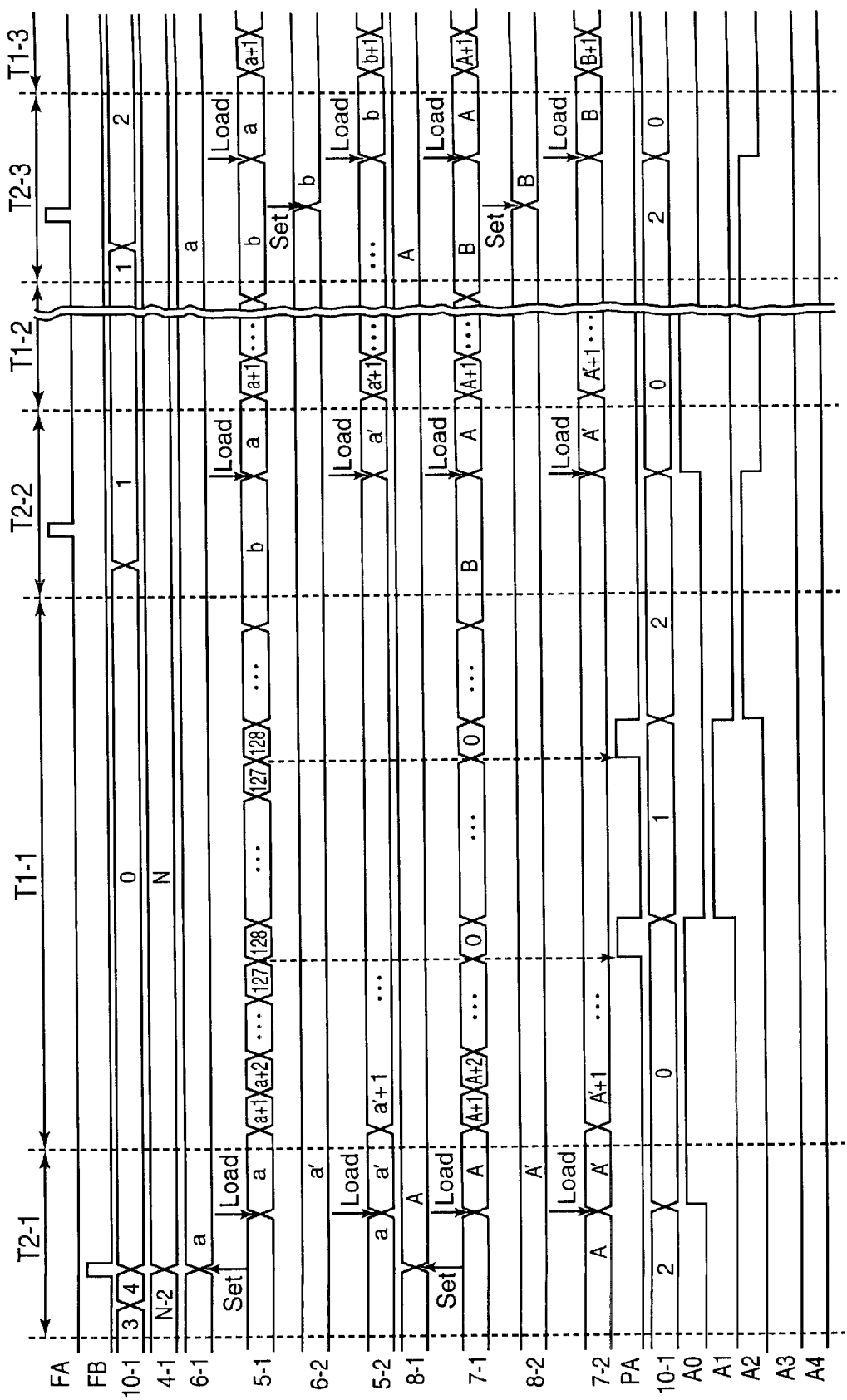
FIG. 6 is a timing chart of enlarging a part of the timing chart shown in FIG. 5.

FIG. 6 is a timing chart of enlarging a part of the timing chart shown in FIG. 5.

With referring FIGS. 1, 5 and 6, the printing operation mentioned above is depicted when a limit counter flag is not generated.

In a case that the division count comparator flag "FB" of the block "B" is generated during an inactive period such as T2-1, the division number counter 10-1 in the block "A" is reset to "0". The level counter 4-1 counts up, wherein the level counter 4-1 is assumed to count up from N-2 to N. Current counter value of the printing dot counter 5-2 in the block "B" is written into the printing dot counter load value register 6-1. Further, current counter value of the limit counter 7-2 in the block "B" is written into the limit counter load value register 8-1.

Loading of data from the printing dot counter load value register 6-1 and the limit counter load value register 8-1 is performed at a timing when a count value load flag is generated.

Accordingly, the inactive period T2-1 finishes and the process proceeds to a line readout period T1 such as T1-1.

The printing dot counter 5-1 counts up whenever a "True" value is supplied from the level comparator 3-1 and generates a printing dot counter flag "PA" whenever a count value reaches a nominal value of simultaneous turn-on pixels such as 128. The count value is set to "1" when a next "True" value is supplied and the counting is continued thereafter. FIGS. 5 and 6 show that the printing dot counter flag "PA" is generated 2 times during the line readout period T1-1. A value of the division number judging counter 9-1a is counted up to 2 by the printing dot counter flag "PA". In this case, a division number of printing at a gradation to be printed currently becomes 3. Further, in this case, a limit counter flag "LA" is not generated. The data mask producing section 9-1 produces 5 data masks A0 through A4 on a basis of the division number judging counter 9-1a. However, the division number is 3, so that the data masks A3 and A4 are overridden.

During the line readout period T1-1, since a count value of the division number counter 10-1 is "0", a printing data from the level comparator 3-1 is masked by the data mask A0 in the AND gate 13-1. The printing data after masked and a printing data from the block "B" are synthesized by the OR gate 14 and transferred to the thermal head, wherein the printing data from the block "B" is corresponding to a final division number at a gradation number, which is smaller than the gradation number indicated by the level counter 4-1 of the block "A" by 1.

When the line readout period T1-1 finishes, the process proceeds to an inactive period T2-2. In this inactive period T2-2, since the division count comparator flag "FB" is not generated in the block "B", a value of the level counter 4-1 does not change. Further, values of the printing dot counter load value register 6-1 and the limit counter load value register 8-1 do not change and a same value in the previous line readout period T1-1 is loaded in the printing dot counter 5-1 and the limit counter 7-1. Furthermore, the division number counter 10-1 is counted up from 0 to 1.

At this point of time, a value of the division number judging counter 9-1a is 2 and a value of the division number counter 10-1 is 1 as shown in FIG.5, and then these values are compared by the division number count comparator 11-1. Since these values are different from each other, the division count comparator flag "FA" is not generated this time.

When the inactive period T2-2 finishes, the process proceeds to a line readout period T1-2. During this period T1-2, a same operation as that of the previous line readout period T1-1 is performed and the same data masks A0 through A3 are produced. However, the division number counter 10-1 changes from 0 to 1, so that a printing data from the level comparator 3-1 is masked by the data mask A1 in the AND gate 13-1.

In a next inactive period T2-3, since the division count comparator flag "FB" is not generated in the block "B" as same as in the inactive period T2-2, a value of the level counter 4-1 in the block "A" does not change. Further, values of the printing dot counter load value register 6-1 and the limit counter load value register 8-1 do not change. The same values as in the previous line readout period T1-2 are loaded into the printing dot counter 5-1 and the limit counter 7-1 respectively. Furthermore, the division number counter 10-1 is counted up from 1 to 2.

At this point of time, a value of the division number judging counter 9-1a is 2 and a value of the division number counter 10-1 is 2 as shown in FIG.5, and then these values are compared by the division number count comparator 11-1. Since the value of the division number judging counter 9-1a is equal to the value of the division number counter 10-1 this time, the division number count comparator 11-1 generates the division count comparator flag "FA" and the flag "FA" is transferred to the block "B".

The division number counter 10-2 in the block "B" is reset to "0" by the flag "FA". Further, the level counter 4-2 in the block "B" counts up from "N-1" to "N+1". Furthermore, current count value of the printing dot counter 5-1 in the block "A" is written into the printing dot counter load value register 6-2 in the block "B".

Moreover, current count value of the limit counter 7-1 in the block "A" is written into the limit counter load value register 8-2 in the block "B".

Data from the printing dot counter load value register 6-2 and the limit counter load value register 8-2 are loaded into the printing dot counter 5-2 and the limit counter 7-2 respectively at a timing when the count value load flag is generated.

As a result of the above-mentioned processes, during a succeeding line readout period T1-3, the same process as such that the value of the division number counter 10-1 is "0" in the block "A" as mentioned above is performed in the block "B". Accordingly, a data masked by a data mask B0 is outputted from the block "B", wherein the data mask B0 is produced when a count number of the level counter 4-2 is "N+1".

The data masked by the data mask B0 and the other data masked by the data mask A2 from the block "A" are synthesized by the OR gate 14 and transferred to the thermal head, wherein the data mask A2 is produced when a level count is "N". Accordingly, a data of a level count value "N+1" and a division count value "0" are generated in a first half of this line readout period T1-3 and another data of a level count value "N" and a division count value "2" is generated in a second half of this period T1-3. Further, total amount of both printing data is equal to the nominal value of simultaneous turn-on pixels such as 128.

A same operation as that of the block "A" when a count level of the level counter 4-2 is "N" is performed in the block "B" even in a succeeding line readout period thereafter. On the other hand in the block "A", a count value of the division number counter 10-1 is more than 5, so that a data is completely masked. Accordingly, only a data from the block "B" is supplied to the OR gate 14 until a value of division number judging counter becomes equal to a value of the division number counter.

Along with a progress of a level count value such that "N+2", "N+3" and more in order, a process is succeeded to the blocks "A" and "B" alternatively. The process is repeated until printing of total gradations is completed. Accordingly, printing of one line is completed, wherein a total number of printing dots in each line readout period is exactly equal to the nominal value of simultaneous turn-on pixels such as 128.

Figure 7:
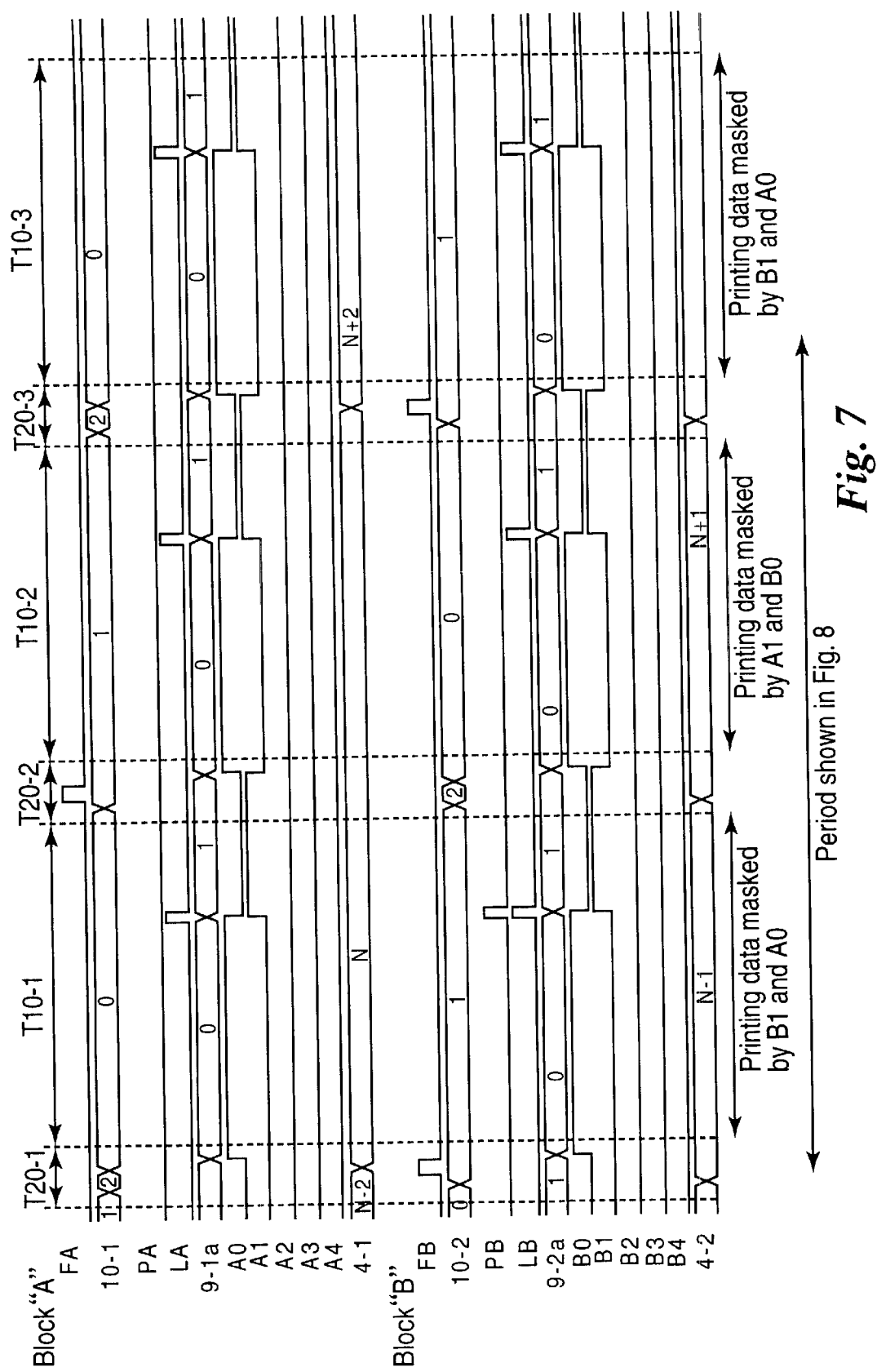
FIG. 7 is a timing chart of depicting a detailed operation of each signal in the data control block when a limit count flag occurs according to the embodiment of the present invention.

FIG. 7 is a timing chart of depicting a detailed operation of each signal in the data control block when a limit count flag occurs according to the embodiment of the present invention.

Figure 8:
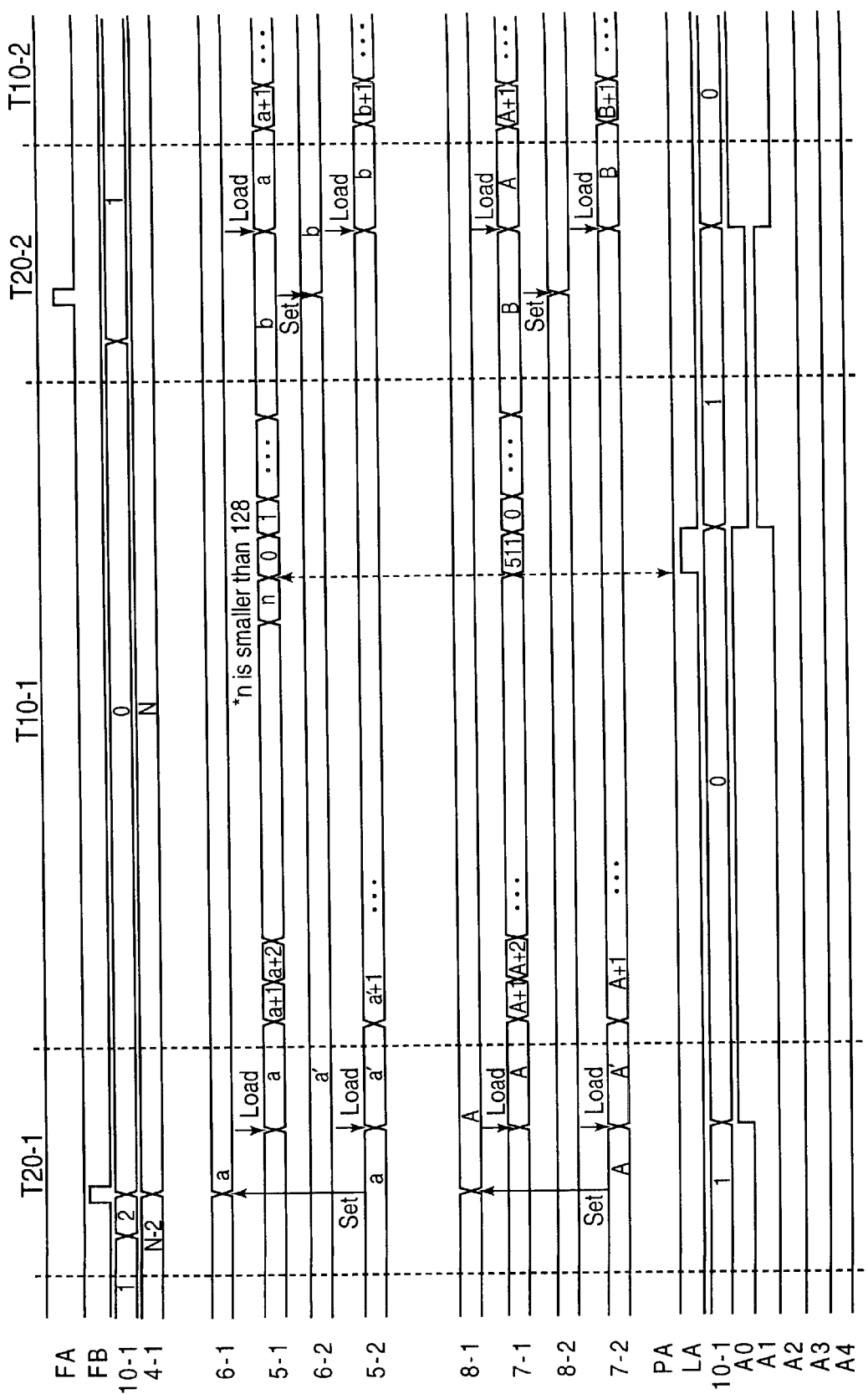
FIG. 8 is a timing chart of enlarging a part of the timing chart shown in FIG. 7.
Figure 9:
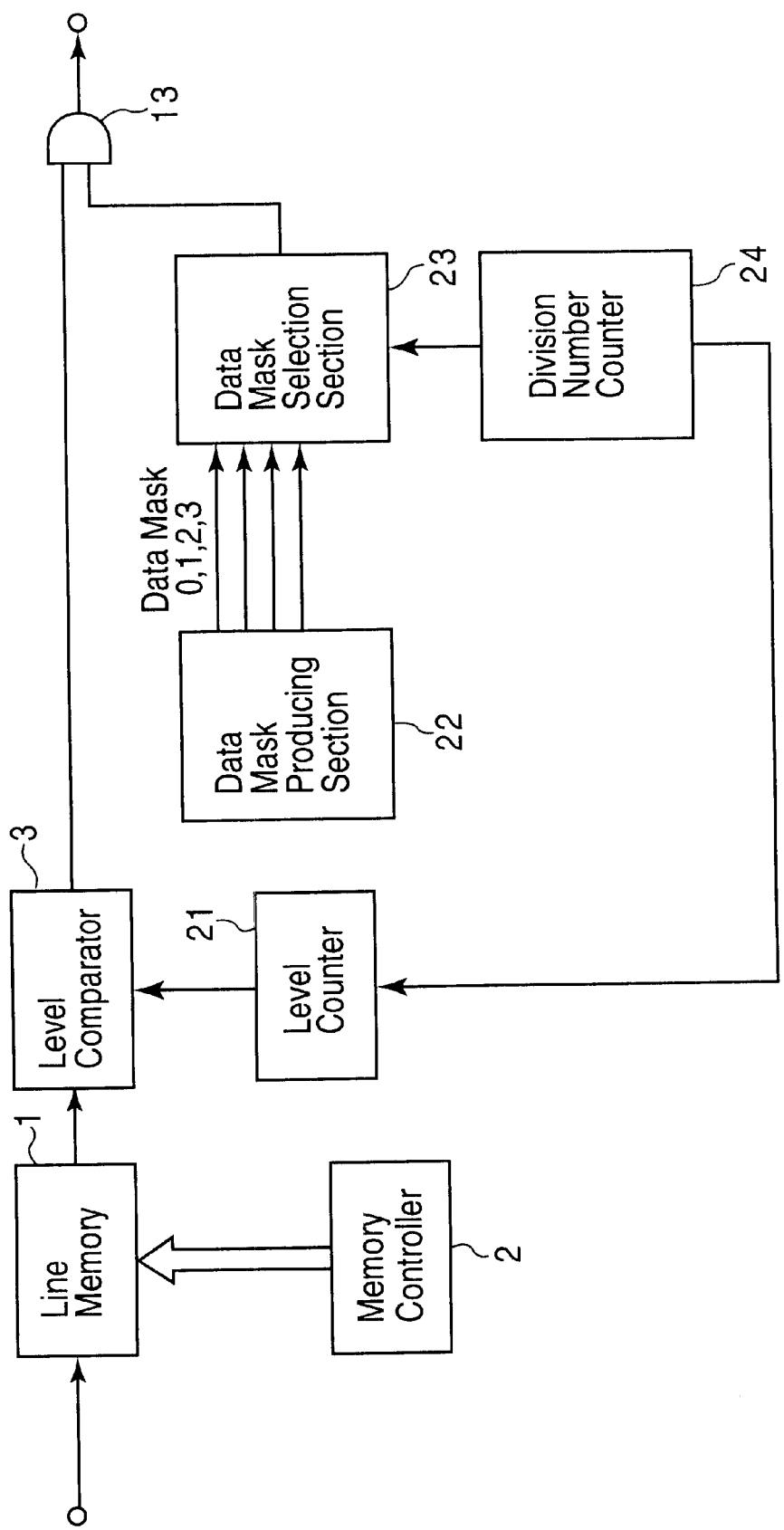
FIG. 9 is a block diagram of signal processing circuit in a digital printer performing divisional printing according to the prior art.
Figure 10:
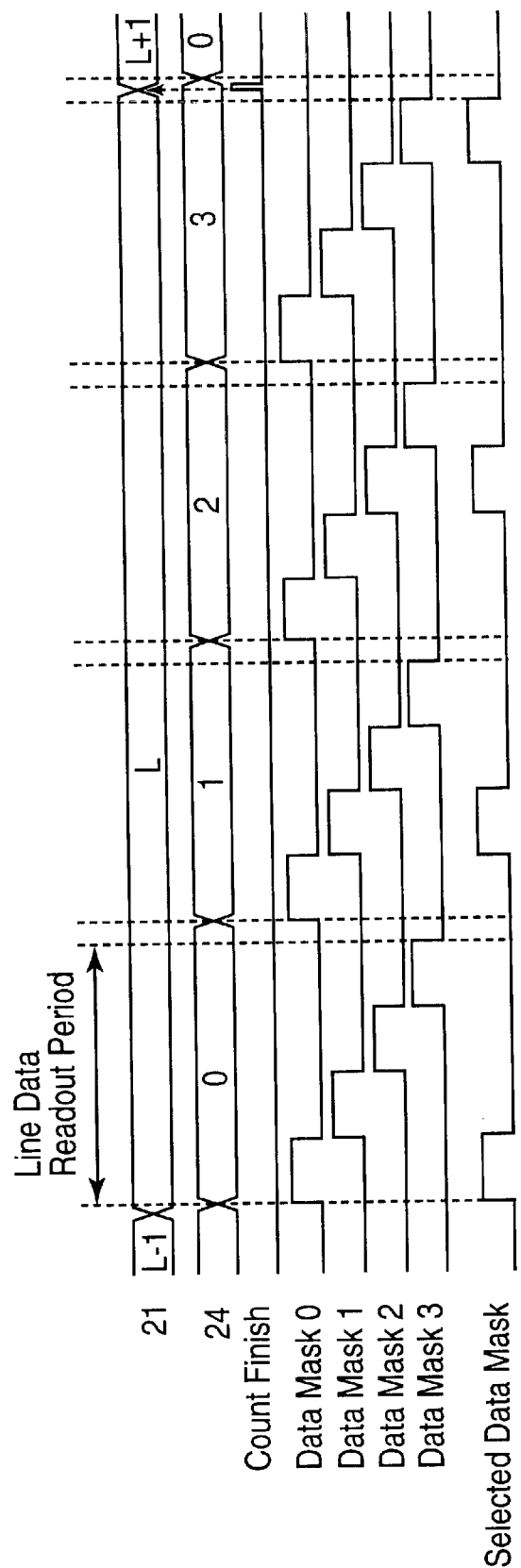
FIG. 10 is a timing chart showing behavior of each signal at a gradation number "L" according to the prior art.
Figure 11:
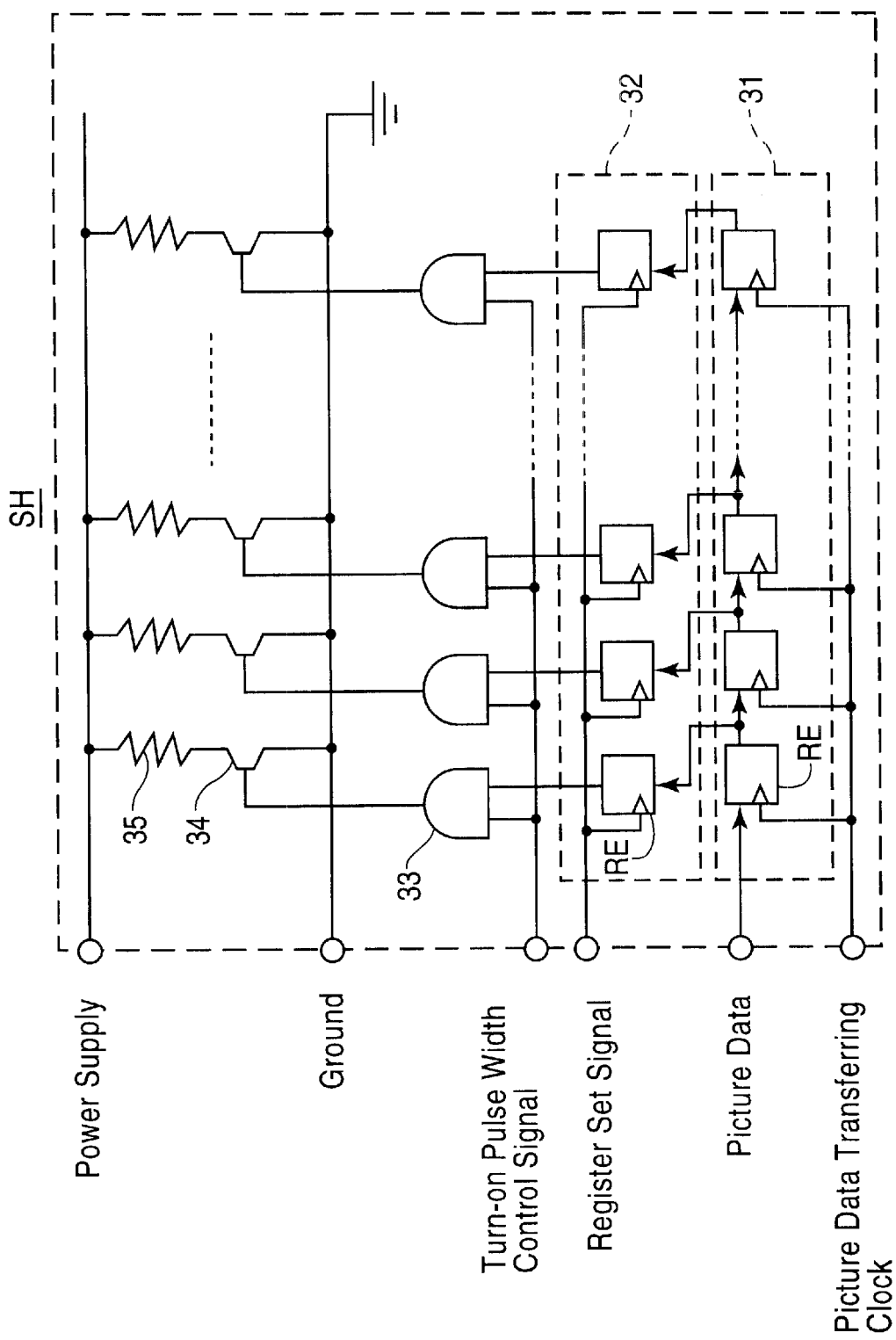
FIG. 11 shows an electrical configuration of a thermal head according to the prior art.

FIG. 8 is a timing chart of enlarging a part of the timing chart shown in FIG. 7.

In a case that a value of the level counter 4-1 is "N" and a limit counter flag "LA" is generated by the limit counter 7-1 in the block "A" during a line readout period such as T10-1 and T10-2, first of all, a count value of the limit counter 7-1 is reset to "0". Further, the limit count flag "LA" is transferred to the data mask producing section 9-1 as a same manner as a printing dot counter flag "PA" and used as a flag for producing a data mask. Furthermore, a count value of the printing dot counter 5-1 is reset to "0". Accordingly, the printing dot counter 5-1 restarts from "0" in conjunction with generating a new data mask at a point of time when the limit counter flag "LA" is generated.

As mentioned above, a limit counter flag "LA" functions as a same manner as a printing dot counter flag "PA". However, the limit counter flag "LA" from the limit counter 7-1 manages data masks A0 through A4 and the printing dot counter 5-1 so as for a number of printing data not to exceed 512 dots of total number of pixels per line during one line readout period although the printing dot counter flag "PA" from the printing dot counter 5-1 manages a number of simultaneous turn-on pixels so as to be a nominal value.

The limit counter flag "LA" generates before a number of printing dots at a dot number equivalent to one line of the thermal head reaches the nominal value of simultaneous turn-on pixels such as 128, so that a number of simultaneous turn-on pixels is less than such the nominal value 128.

Accordingly, in a case that a limit counter flag is generated, head printing turn-on electricity can not be maintained constantly. This situation is limited to a case that a total number of printing pixels in one line is less than a nominal value of simultaneous turn-on pixels. Depending upon data contents or a design of a picture, uneven thickness seldom happens due to limited conditions in comparison with the divisional turn-on system of the prior art.

While the invention has been described above with reference to specific embodiment and method thereof, it is apparent that many changes, modifications and variations in the arrangement of equipment and devices can be made without departing from the invention concept disclosed herein. For example, a case of performing a block division drive, in which a plurality of data lines supplied to a thermal head exist, is not mentioned. However, in this case, it can be realized by that a function, which distributes data to each data line by the time sharing method prior to transferring the data to a thermal head, is provided between the OR gate 14 and the thermal head. Further, in a case that there exist too many numbers of block divisions to catch up a speed of reading out from the line memory, a countermeasure can be made by increasing a number of circuit blocks shown in FIG. 1 and by arranging them in parallel.

According to an aspect of the present invention, there provided a digital printer, which can exhibit excellent effects mentioned below.

Turn-on electricity supplied to a thermal head can always be held constant as far as a limit counter flag is not generated. Further, a change of turn-on electricity can be suppressed.

Power consumption and power capacity can be decreased by controlling a number of simultaneous turn-on pixels. Furthermore, power consumption per unit hour can be managed in an approximate constant value with high accuracy in comparison with the prior method. Accordingly, uneven thickness caused by load change of a power supply for driving a line head can be reduced, and then picture quality can be prevented from deterioration.

According to another aspect of the present invention, there provided a digital printer having an inherent printing system, in which division numbers are changed all the time so as for a numbers of simultaneous turn-on pixels to be held constant. Accordingly, a printing speed can be improved most effectively under a specific condition, in which maximum power consumption is limited to less than a predetermined value.

What is claimed is:

1. A digital printer of receiving a digital picture data composed of pixels having a multi-gradation data respectively, obtaining a line composed of printing pixels having a density difference of multi-gradations on a recording paper by controlling the digital picture data with a line head whether or not there exist ink transcription at each gradation and printing a picture by recording a plurality of lines obtained by scanning with the line head on a recording paper, said digital printer comprising:

counting means for counting a number of pixels for printing at each gradation;

dividing means for dividing total pixels into several groups in accordance with a count value of said counting means; and deciding means for deciding a dividing number of groups, said digital printer is further characterized by that a range of grouping and a dividing number of groups are changeable so as for a number of printing pixels in said groups to be equal to a predetermined number as a number of simultaneous printing pixels, and that a pixel of simultaneously printing in one line is limited to a unit of the group during printing operation at each gradation, and that printing of each gradation is divided into a plurality of times.

2. The digital printer in accordance with claim 1, wherein said digital printer is further characterized by that in a case that a group of which a number of printing pixels "m" is less than a predetermined number of simultaneous printing pixels "N" occurs by grouping while printing a gradation number "L", a gradation number "L+1" is printed, and by selecting "N−m" pixels out of pixels allocated in a different location from pixels included in said group and printing the "N−m" pixels in conjunction with pixels of said group, a total number of printing pixels is always held equal to the predetermined number of simultaneous printing pixels "N".

3. The digital printer in accordance with claim 1, wherein said digital printer is further characterized by that in a case that a group of which a number of printing pixels "m" is less than a predetermined number of simultaneous printing pixels "N" occurs by said grouping while printing a gradation number "L", a gradation number "L+1" is printed, and that selecting a pixel corresponding to a condition of allocating in a different location from pixels included in said group, in a case that a number of pixels included in the pixel corresponding to said condition is less than "N−m", further selecting another pixel so as for a number of pixels corresponding to said condition to be a maximum limit and by printing these pixels in conjunction with pixels of said group, a total number of printing pixels approaches to the predetermined number of simultaneous printing pixels "N" maximally.

4. A printing method of a digital printer, which receives a digital picture data composed of pixels having a multi-gradation data respectively, and obtains a line composed of printing pixels having a density difference of multi-gradations on a recording paper by controlling the digital picture data with a line head whether or not there exist ink transcription at each gradation and prints a picture by recording a plurality of lines obtained by scanning with the line head on a recording paper, said printing method comprising steps of:

counting a number of pixels for printing at each gradation;

dividing total pixels into several groups in accordance with a count value of said counting means; and deciding a dividing number of groups, said printing method is further characterized by that a range of grouping and a dividing number of groups are changeable so as for a number of printing pixels in said groups to be equal to a predetermined number as a number of simultaneous printing pixels, and that a pixel of simultaneously printing in one line is limited to a unit of the group during printing operation at each gradation, and that printing of each gradation is divided into a plurality of times.

5. The printing method of the digital printer in accordance with claim 4, wherein said printing method is further characterized by that in a case that a group of which a number of printing pixels "m" is less than a predetermined number of simultaneous printing pixels "N" occurs by grouping while printing a gradation number "L", a gradation number "L+1" is printed, and by selecting "N−m" pixels out of pixels allocated in a different location from pixels included in said group and printing the "N−m" pixels in conjunction with pixels of said group, a total number of printing pixels is always held equal to the predetermined number of simultaneous printing pixels "N".

6. The printing method of the digital printer in accordance with claim 4, wherein said printing method is further characterized by that in a case that a group of which a number of printing pixels "m" is less than a predetermined number of simultaneous printing pixels "N" occurs by said grouping while printing a gradation number "L", a gradation number "L+1" is printed, and that selecting a pixel corresponding to a condition of allocating in a different location from pixels included in said group, in a case that a number of pixels included in the pixel corresponding to said condition is less than "N−m", further selecting another pixel so as for a number of pixels corresponding to said condition to be a maximum limit and by printing these pixels in conjunction with pixels of said group, a total number of printing pixels approaches to the predetermined number of simultaneous printing pixels "N" maxim ally.

* * * * *